United States Patent Office 3,813,363
Patented May 28, 1974

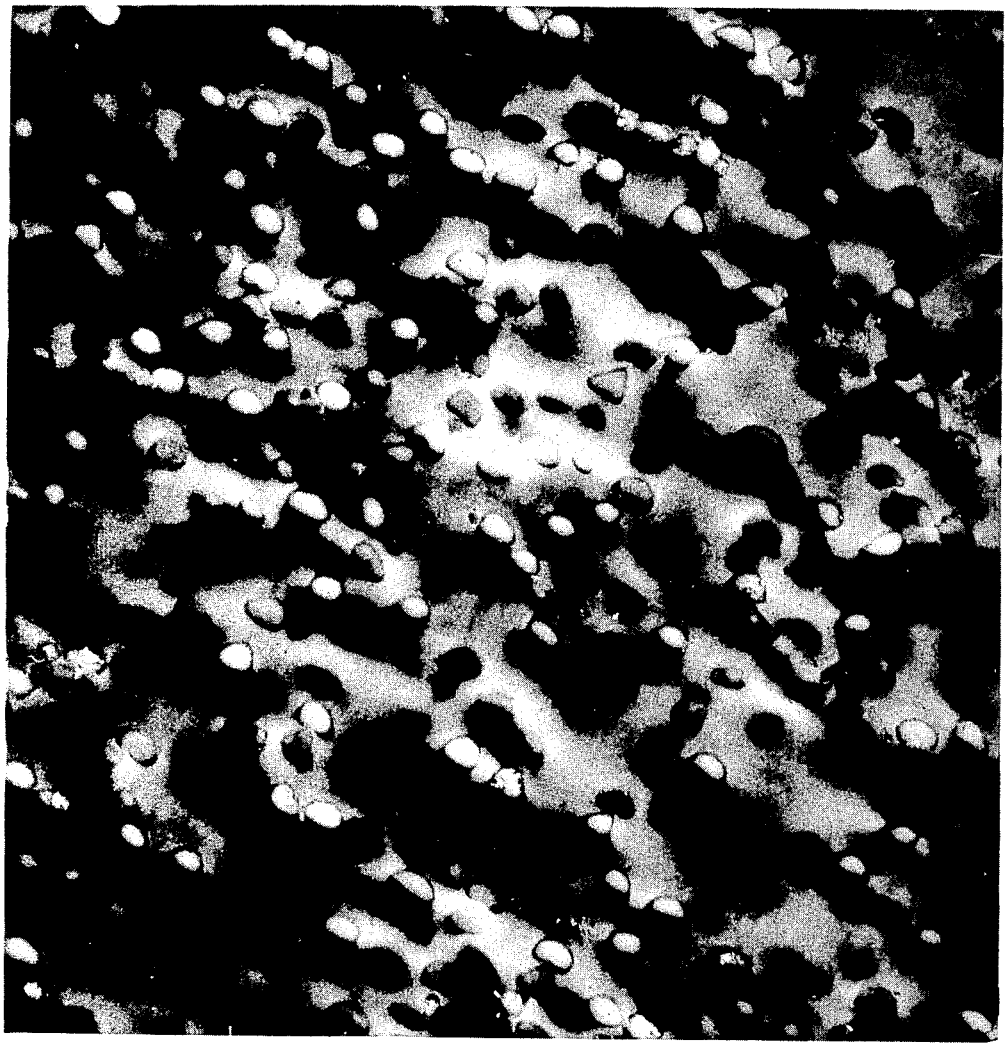

3,813,363
AQUEOUS COATING COMPOSITIONS OF CYCLIC SULFONIUM ZWITTERIONS AND COLLOIDAL SOLS
Donald L. Schmidt, Hugh B. Smith, and Wilhelm E. Walles, Midland, Mich., assignors to The Dow Chemical Company, Midland, Mich.
Filed Aug. 16, 1971, Ser. No. 172,332
The portion of the term of the patent subsequent to Jan. 18, 1989, has been disclaimed
Int. Cl. C08g 5/02, 33/10; C10m 7/08, 7/28; F16c 33/20
U.S. Cl. 260—29.3
19 Claims

ABSTRACT OF THE DISCLOSURE

Aqueous coating compositions are prepared from water-soluble cyclic sulfonium zwitterions of Formula I:

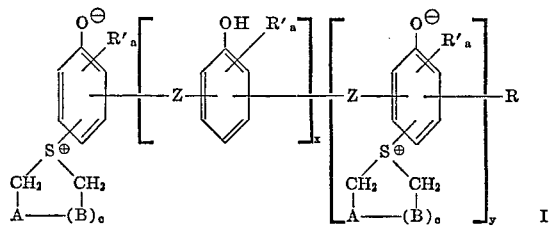

where Z is a bridging ether, ester or alkylene group and $\Sigma(x+y)=0-20$ and aqueous inorganic and organic colloidal sols stable at alkaline pH. These compositions cure thermally to form water-insoluble coatings with the colloidal particles dispersed throughout a binder matrix of polymerized zwitterionic monomer. Coatings of unusual hardness, scratch resistance, flexibility, resilience and lubricity can be obtained using sols of such materials as silica, polytetrafluoroethylene, polyethylene, styrene-butadiene latex, and water-insoluble oils.

BACKGROUND

Hatch U.S. Pat. 3,544,499 describes water-insoluble coatings prepared from water-soluble, thermally polymerizable salts containing a sulfonium cation and certain anions such as carboxylate, sulfonate, or phosphonate. These coatings are applied as an aqueous solution or dispersion with pigments and other coating additives, dried and thermally cured to form a hard, water-insoluble surface coating or film.

A new class of water-soluble, thermally polymerizable sulfonium salts is described in Hatch et al., Belgium Pat. 757,583 based on U.S. applications S.N. 866,762 and 866,763 filed Oct. 15, 1969. These salts, cyclic sulfonium zwitterions of Formula I, are reactive condensation polymerization monomers. Depending on the degree of sulfonium substitution, the monomers are chain-extending or cross-linking. Mild heating converts these zwitterionic monomers into solid, water-insoluble polymers.

STATEMENT OF THE INVENTION

It has been discovered that the water-soluble cyclic sulfonium zwitterions of Formula I can be blended with aqueous inorganic and organic sols stable at alkaline pH to give stable aqueous coating compositions without coagulation or agglomerization. Furthermore, not only are the cyclic sulfonium zwitterions compatible with the aqueous sols, but on curing these compositions form clear, durable films and coatings with the inorganic and organic colloidal particles dispersed throughout the polymer matrix.

More specifically, a coating composition has been discovered comprising:

A. A water-soluble, thermally polymerizable monomer consisting of at least one cyclic sulfonium zwitterion of the formula:

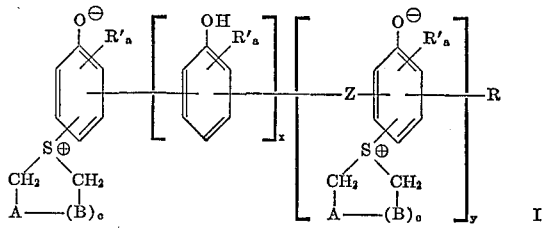

where R is H, Cl, Br, OH, or $-OC_1-C_4$ alkyl and $a$ is 0—2; R' is H, Cl, Br, or $C_1-C_4$ alkyl; Each sufonium group is ortho or para to the phenoxide group; A and B are $-CH_2-$ or $-CHR'$, and $c$ is 1 or 2; Z is a bridging group of the formula:

(1) $-O-$, $-S-$, or $-O(C_mH_{2m})O-$ where $m$ is 1-6, and $\Sigma(x+y)=0-1$;
(2) $-CR_2''-$ where R'' is $C_1-C_4$ alkyl, and $\Sigma(x+y)=0-1$;

(3) 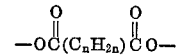

wherein $n$ is 0-6, and $\Sigma(x+y)=0-1$; or
(4) $-CH_2-$ where $\Sigma(x+y)=0-20$; and B. An aqueous inorganic or organic colloidal sol stable at alkaline pH and having colloidal particle size of about 1-1000 m$\mu$; said composition forming on drying a water-insoluble polymer with the colloidal particles dispersed throughout the polymer matrix.

These coating compositions can be applied as an aqueous solution or dispersion containing as high as 50–75 wt. percent total solids to a surface without extensive surface preparation. Drying and polymerization occur rapidly at relatively moderate temperatures of about 40°–200° C. The resulting polymers have excellent hydrolytic stability and solvent resistance as well as effective adhesion to many surfaces.

The colloidal particles in the polymer coating, essentially uniformly dispersed and bound, impart specific coating properties. For example, hard transparent coatings with superior scratch resistance are obtained with colloidal silica. Colloidal polytetrafluoroethylene gives slick coatings with a low coefficient of friction. Addition of a colloidal latex provides improved impact resistance, resiliency and flexibility.

GENERAL DESCRIPTION

A. Cyclic Sulfonium Zwitterion Monomers—CSZ

As described in Hatch et al. Belgium Pat. 757,583 and U.S. applications S.N. 866,762 and 866,763, the cyclic sulfonium zwitterion monomers can be prepared by reaction of a phenol (II) with a cyclic polymethylenesulfoxide (III) to give a sulfonium salt (IV) followed by reaction with base to give a zwitterion monomer (V). The zwitterion monomer spontaneously polymerizes with only moderate heating to give solid condensation polymers with a repeating unit such as VI:

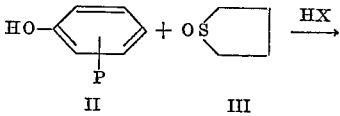

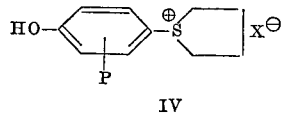

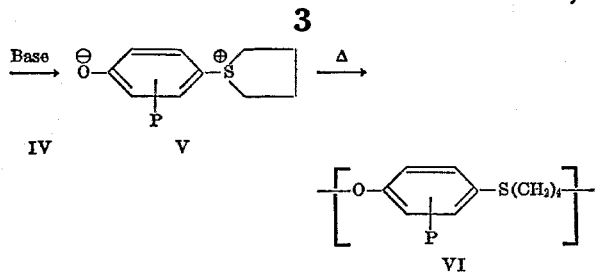

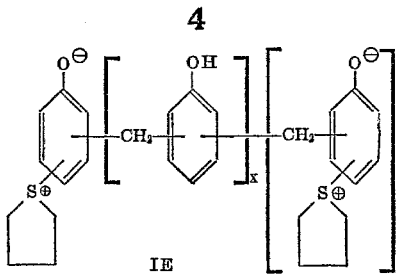

The CSZ monomers can be isolated in solid form, usually as a crystalline hydrate or alcoholate. They are soluble in methanol in nearly all proportions, and generally have a similar solubility in water. Thus, aqueous and aqueous $C_1$-$C_3$ alcohol solutions containing 50–75 wt. percent solids can be obtained. Since solvation stabilizes the monomers, the aqueous solutions have good storage life at normal temperatures. Although the monomers are electrically neutral, they are alkaline with a typical pH value of about 10.5–11.5. Spontaneous polymerization occurs when the solvent is removed from a CSZ solution at mild temperatures, e.g., about 20°–100° C. Rapid polymerization occurs when an aqueous solution is applied to a suitable surface and heated at 40°–200° C.

During polymerization the zwitterion charges disappear without formation of an organic byproduct. With a chain-extending monomer having an average of about 1 sulfonium group per molecule, a soft, essentially linear polymer ranging in average molecular weight from about 2000–46,000 is obtained. With a cross-linking monomer having an average of more than about 1.1 sulfonium groups per molecule, hard, cross-linked, water and solvent resistant polymers are obtained.

Chain extending CSZ monomers are preferably prepared from mononuclear phenols such as phenol, resorcinol, catechol, cresol, p-sec.-butylphenol, etc., while cross-linking monomers are obtained from polynuclear phenols such as bis(resorcinol) ethers, bisphenols, bis(catechol) esters, and phenol-formaldehyde novolac resins. Preferably the cyclic sulfonium group is tetrahydrothiophene bonded through the sulfur atom to the phenolic ring e.g., Formula I where —A—(B)$_c$— is —CH$_2$CH$_2$—.

B. CSZ Coating Monomers

For use in preparing the aqueous cyclic sulfonium zwitterion-colloidal sol coating compositions, at least one water-soluble cyclic sulfonium zwitterion of Formula I is required, preferably a cross-linking monomer or a mixture of a cross-linking and a chain-extending monomer having an average of at least 1.1 sulfonium groups per molecule (S$^\oplus$/mer). Excellent coatings with high solvent resistance are obtained by homopolymerization of a cross-linking monomer having 1.5–2.0 S$^\oplus$/mer. or by copolymerizing such a monomer with a chain-extending monomer, the mixed monomers having an average of at least 1.1 and preferably about 1.5–2.0 S$^\oplus$/mer.

Particularly suitable for use herein are the monotetramethylenesulfonium zwitterion monomers of phenol (IA), o-cresol (IB), and 2,6-dichlorophenol (IC) and polytetramethylenesulfonium zwitterion monomers of bis(resorcinol)polymethylene ether (ID) and a phenolformaldehyde novolac resin (IE):

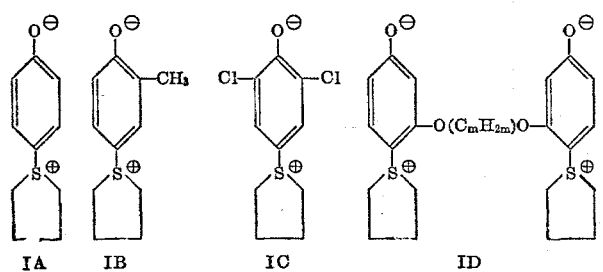

Preferred as a cross-linking monomer are the bisresorcinol di- and tetramethylene ether sulfonium zwitterions (ID: $m=2, 4$) and the cyclic zwitterion monomers of a water-soluble novolac resin having an average degree of polymerization of about 2–5 and about 1.1–2.5 S$^\oplus$/mer. (IE: $\Sigma(x+y)=1-4, y=0.1-1.5$).

The cross-linking monomers ID and IE homopolymerize to give smooth hard coatings with excellent adhesion to solid surfaces and high resistance to strong acids and bases, boiling water, and common organic solvents. Copolymers of the chain-extending and cross-linking CSZ monomers also give smooth hard coatings with the solvent resistance increasing with increasing proportion of the cross-linking monomer. Highly symmetrical monomers, such as IA, tend to crystallize and form rough, grainy coatings when homopolymerized, but can be used effectively mixed with another CSZ monomer, particularly a cross-linking monomer such as ID or IE.

C. Inorganic and Organic Colloidal Sols

In addition to their film-forming properties, the cyclic sulfonium zwitterion monomers have been discovered to be compatible with inorganic and organic colloidal sols stable at alkaline pH. Thus an aqueous solution of the zwitterionic monomers can be blended with aqueous colloidal sols of silica, polytetrafluoroethylene, polyethylene, styrene-butadiene latex, silicone oil, etc., to form a stable coating composition. Drying and curing gives a polymer with a highly uniform distribution of the colloidal particles throughout the polymer matrix. Visual evidence of the uniform distribution of the colloidal particles in the coating is given in the Figure, a photomicrograph of a vertical cross-section of a styrene-butadiene latex dispersed in a matrix of polymerized CSZ at a magnification of 37,840×.

The nature of the inorganic or organic colloidal sol is not critical provided that the sol blended with the aqueous zwitterionic monomer is stable at the alkaline pH of the monomer solution. A colloidal sol suitable for use herein is an aqueous dispersion of solid particles or liquid droplets having at least one dimension, preferably the particle diameter, in the range of about 1–1000 m$\mu$ (10–10$^4$ A.). Many such sols are commercially available.

Typical of an inorganic sol useful herein are the basic silica aquasols described in Bechtold and Snyder, U.S. Pat. 2,574,902, Rule U.S. 2,577,485, Iler U.S. 2,597,872 and Mindick U.S. 3,502,593. Such silica aquasols contain silica particles with an average particle size of about 3–150 m$\mu$ and a ratio of SiO$_2$/Na$_2$O of about 60–300 or more. Particularly suitable are silica sols containing about 30–55% SiO$_2$ with a particle size of about 15–40 m$\mu$ and a pH of about 8.5–9.5.

Other water-insoluble inorganic oxides and pigments such as alumina, iron oxide, magnesium oxide, titanium dioxide, calcium carbonate and barium sulfate can be prepared in colloidal size and used herein.

Typical organic sols useful herein include aquasols of the tetrafluoroethylene polymers and copolymers of Plunkett U.S. Pat. 2,230,654, Renfrew U.S. 2,534,058, and Roberts U.S. 3,063,922. Also, water-soluble organic liquids such as the tetrafluoroethylene telomers of Skehan U.S. 3,505,229, the perfluoropropylene oxide polymers and derivatives of Milian U.S. 3,214,478, Miller U.S.

3,242,218 and Selman U.S. 3,274,239 in aquosol form can be used. Canadian Pat. 849,069 describes a colloidally dispersed polypropylene having average particle size of about 20–500 mμ which can be blended with the cyclic sulfonium zwitterionic monomer.

Aqueous colloidal dispersions of solid addition polymers of ethylenically unsaturated monomers such as a styrene-butadiene latex, an acrylic latex, a vinyl chloride latex, etc., can also be used as the colloidal sol component. Latex terpolymers of a carboxylic acid, styrene, and butadiene as described in Miller et al. U.S. Pat. 3,563,946, also U.S. 3,256,234 and British Pat. 1,229,510 are suitable.

Mixtures of inorganic and organic colloidal particles, such as the codispersions of polytetrafluoroethylene and anhydrous oxides described in Ikeda U.S. Pat. 2,592,147, also can be used to give smooth hard coatings with both a low coefficient of friction and superior scratch resistances. Water-insoluble lubricants including silicone oils and greases can be colloidally dispersed and used alone or in combination with other colloids to improve coating lubricity and wear resistance.

D. CSZ-Colloidal Sol Coating Compositions

In practice the cyclic sulfonium zwitterion-colloidal sol coating compositions are conveniently prepared by mixing an aqueous sol and an aqueous or aqueous alcohol solution of the CSZ monomer. Because of the high water solubility and compatibility of the zwitterionic monomers, stable coating compositions containing 50–75 wt. percent total solids can be prepared. Compatible pigments and other conventional coating additives can be included.

In general the coating compositions contain at least 5% colloid and at least 15–20% CSZ monomer based on total composition. For durable surface coatings, at least 20 wt. percent of the CSZ monomer should be a cross-linking monomer such as ID or IE so that the CSZ has an average of at least 1.1 and preferably about 1.15–2.0 $S^{\oplus}$/mer. Particularly suitable for many coating compositions is a mixture of 40–75 wt. percent of the o-cresol monomer IB and 60–25 wt. percent of the bis(resorcinol) ether monomer ID or the novolac monomer IE.

E. Films and Coatings

The new aqueous coating compositions are applied by spraying, dipping, brushing, roll coating, or other conventional means to the desired substrate followed by drying and thermal polymerization of the cyclic sulfonium zwitterionic monomer. For most coatings, heating at 75–200° C. for 5–15 minutes is adequate to dry the coating and convert the monomer irreversibly into a water and solvent resistant binder for the dispersed colloid. The coating adheres tenaciously to most solid substrates, but unsupported films can be prepared by curing a cast film on a nonadherent surface. Coating thicknesses of about 0.1–2.0 mils or more can be obtained in a single pass using coating compositions containing about 10–50% total solids.

Coatings can be applied to nonporous surfaces such as glass, metals, plastics as well as to porous products such as paper, hardboard, wood, textiles, etc., to give strong, durable finishes. Because of the toughness, flexibility and adherence, the coatings are particularly valuable applied to plastic sheets and films of polystyrene, polyethylene, polypropylene, polyethylene terephthalate, regenerated cellulose, cellulose acetate, acrylonitrile-butadiene-styrene copolymers, polyamides, polycarbonates, etc. The products to be treated may be in many forms including sheets, films, strands, filaments, beads, pellets, etc., to obtain clear, hard, scratch-resistant surface coatings.

To illustrate further the present invention, the following examples are given. Unless otherwise stated, all parts and percentages are by weight.

EXAMPLE I

Cyclic Sulfonium Zwitterionic Monomers (CSZ-I)

A. A solution of 38.5 parts (0.15 mole) bis-catechol trimethylene ether and 34.4 parts (0.33 mole) tetrahydrothiophene oxide in about 160 parts methanol was treated at 0° C. with anhydrous HCl and the solid bissulfonium chloride was recovered. To prepare the zwitterionic monomer, a methanolic solution of the bissulfonium chloride was slurried with a strong base anion-exchange resin in hydroxide form. The resulting cyclic sulfonium zwitterionic monomer (CSZ) can be isolated by concentration of the methanolic solution or used as methanol or aqueous methanol solution. As an aqueous solution it has a pH of about 10.5–11.5.

B. In a similar manner, a solution of a tetrahydrothiophene oxide and a phenol-formaldehyde novolac resin having an average degree of polymerization of about 3.5 containing about 18% o,o-, 55% o,p-, and 27% p,p-substitution, was treated with HCl and then ion-exchanged to give a water-soluble cyclic sulfonium phenoxide monomer having an average of about 3.2 sulfonium groups per molecule.

C. A solution of 0.25 mole o-cresol and 0.25 mole tetrahydrothiophene oxide in methanol treated with HCl at 0°–10° C. gave 3-methyl-4-hydroxyphenyltetramethylenesulfonium chloride. Ion-exchange gave the corrsponding cyclic sulfonium phenoxide monomer.

D. Other cyclic sulfonium zwitterionic monomers of Formula I are prepared similarly from phenol, bisphenols, bisresorcinol ethers and esters, phenol-formaldehyde novolac resins, etc., and an appropriate polymethylenesulfide or sulfoxide. For use with aqueous sols, a water or aqueous alcohol soluble zwitterionic monomer is required. Thus a water-soluble phenol or polyphenol is normally used.

EXAMPLE 2

CSZ-Silica Sols

Rule U.S. Pat. 2,577,485 and Wolter Canadian Pat. 521,741 describe aqueous sols of finely divided colloidal silica stabilized with NaOH, NH$_4$OH or an organic ammonium hydroxide. Typically these sols contain about 20–50% SiO$_2$ with a particle size of about 10–130 mμ, and have a SiO$_2$/Na$_2$O ratio of 50–400 and a pH of about 8–10, preferably about 8.5–9.5. Such silica sols are commercially available as "Ludox" colloidal silica (du Pont) and Organic Ammonium Silicates (Philadelphia Quartz Co.).

The basic CSZ monomers are compatible with these sols. They can be used to stabilize the silica sols and to form clear films containing the silica dispersed in colloidal form.

A. A solution of 1.56 parts of CSZ–ID–2, the bisresorcinol dimethylene ether bissulfonium monomer of the formula:

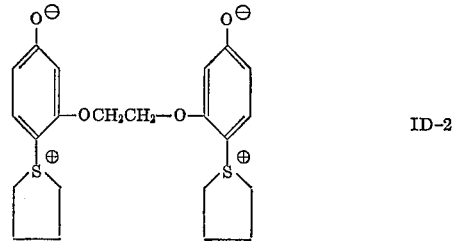

ID-2 in 2.44 parts of methanol and 2.0 parts of water was mixed with 4.6 parts of a NH$_4$OH stabilized silica sol (Ludox AS: 30% SiO$_2$, SiO$_2$/NH$_3$=120, 0.25% NH$_3$) to give an aqueous coating composition without agglomeration or other loss of colloidal stability.

B. 20 parts of Ludox AS diluted with 10 parts water was treated with 10 parts of a strong acid cation-exchange resin in Fe$^{+++}$ form to remove the ammonia. The unstable sol was recovered and mixed with 20 parts of a 50% aqueous solution of CSZ–IB, the monocyclic sulfonium zwitterion from o-cresol:

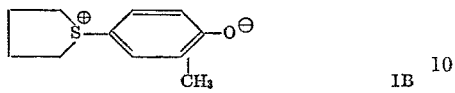

to give a stable alkaline sol containing only 0.023% $NH_3$.

C. 30 parts of a NaOH stabilized silica sol (Ludox SM 30; $SiO_2/Na_2O=50$, 30% $SiO_2$, 0.60% $Na_2O$, 0.01% NaCl) was slurried with a strong acid ion-exchange resin to give an unstable acidic sol (pH about 2). The aqueous sol was recovered and stabilized with 15 parts of a 50% aqueous solution of CSZ–IB. The sulfonium stabilized sol had a pH of 11.5 and contained 0.018% $Na_2O$.

D. An aqueous methanol solution containing 1.56 parts of CSZ–ID–2 and 4.6 parts of Ludox AS was coated on a steel test panel and cured at 85° C. for 15 minutes. The resulting clear coating adhered tenaciously to the panel and had a standard Kentron-Knoop hardness (ASTM Method D–1474–62T) of 56 (Kentron-Knoop hardnesses of several common surfaces include polystyrene 16.5, Plexiglas 16, Formica 35–40, aluminum (2203 alloy) 50, and 316 stainless steel 115). The coating also had impressive scratch and abrasion resistance.

E. A silica sol coating composition containing 0.64 parts of ID–2, 0.3 parts of IB, 0.96 parts methanol, 1.0 part water and 5 parts Ludox AS applied to a steel panel and cured at 85° C. for 20 minutes gave a 0.5 mil coating with a Kentron-Knoop hardness of 65 and superior solvent, abrasion and scratch resistance.

Table 1 shows the effect of varying amounts of silica sol and CSZ monomers ID–2 and IB.

TABLE 1
CSZ-silica sol coatings

| Number | Parts | | | Kentron-Knoop |
| --- | --- | --- | --- | --- |
| | Ludox AS | CSZ–ID–2 | CSZ–IB | |
| 1–1 | 12.8 | 0 | 2.0 | 46 |
| 1–2 | 3 | 1.7 | 0.3 | 50 |
| 1–3 | 4 | 1.7 | 0.3 | 56 |
| 1–4 | 5 | 1.7 | 0.3 | 65 |
| 1–5 | 6 | 1.7 | 0.3 | 70 |
| 1–6 | 7 | 1.7 | 0.3 | (a) | a Insufficient CSZ.

For many applications, optimum hardness and starch-resistance are obtained using about 60±5 wt. percent silica, 24±3% CSZ–IB, and 16±2 CSZ–ID based on total silica and CSZ solids.

F. A silica sol coating composition was prepared by blending 10 parts Ludox SM AS ($SiO_2/Na_2O=300$, 30% solids, 0.1% $Na_2O$) and 10 parts of a 41% solution of CSZ–ID–2 in methanol. Curing at 90° C. (20 minutes) gave a Kentron-Knoop hardness of 42 while curing at 200° C. gave a hardness of 53.

G. A mixture of 0.5 parts of a 38% methanolic solution of CSZ–IE–2.5, the polysulfonium zwitterionic monomer from a phenol-formaldehyde novolac resin having a degree of polymerization of 2.5, 0.5 parts of a 66% methanolic solution of CSZ–IB, 1.0 part water and 2.5 parts Ludox AS (30% $SiO_2$) gave a coating cured at 80° C. (30 minutes) with a Kentron-Knoop hardness of 57.

H. Stable and compatible coating compositions are also obtained by blending a CSZ monomer solution with an organic ammonium silicate such as the tetra(hydroxyethyl) ammonium silicate $(NR_4) \cdot 22.5SiO_2$ available as "OAS No. 1" from Philadelphia Quartz Co.

Typical hardness values of coatings from CSZ–ID–2 and "OAS No. 1" are given in Table 2.

TABLE 2
CSZ-organic ammonium silicate coatings

| Number | Percent $SiO_2$[a] | Kentron-Knoop hardness, cured at — | |
| --- | --- | --- | --- |
| | | 80° C. | 180° C. |
| 2–1 | 0 | | 25 |
| 2–2 | 25 | 29 | 29 |
| 2–3 | 40 | 37 | 37 |
| 2–4 | 50 | 40 | 44 |
| 2–5 | 58 | 47 | 51 |
| 2–6 | 63 | 53 | 62 |

[a] Based on total CSZ-$SiO_2$ solids.

The coatings cured at 180° C. were not affected by immersion in boiling water for 24 hours. Tests with a Tabor Abraser indicate that these ammonium silicate-sulfonium coatings have better wear resistance than commercial melamine-phenol products such as Formica. Also they adhere well to metal, glass, wood and such polymers as melamine, Mylar and Surlyn.

EXAMPLE 3

CSZ-Teflon Sols

A. Typically 0.7 part of CSZ–ID–4, the bis-resorcinol tetramethylene ether bissulfonium monomer of the formula:

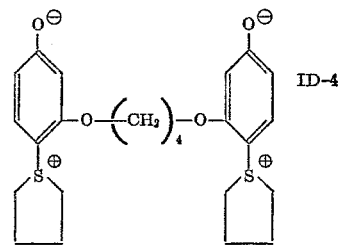

in 1.3 parts methanol was added to 1 part water and 1 part of a commercial fluorocarbon resin dispersion containing about 60% 50–500 mμ resin particles in aqueous dispersion at a pH of about 10 (du Pont "Teflon" 30 TFE resin dispersion). Blending gave a stable CSZ-Teflon sol. Applied to a steel panel and cured at 85° C. (15 minutes) the solution gave a slippery coating with a Kentron-Knoop hardness of 5.6 (1 mil). A Tabor Abrason Test (CS–17 calibrase wheel, 100 g. load) showed a weight loss of 10 mg./1000 revolutions while a coating of the sulfonium monomer alone lost 55 mg./1000 revolutions.

B. A coating of 90% CSZ–ID–4 or CSZ–ID–2 and 10% colloidal polytetrafluoroethylene prepared as in 3A had a coefficient of friction of 0.10–0.11 compared with 0.15 for nylon. In a test on a Tabor Abrader with a 1000 g. ball, the 90% CSZ–10% Teflon coating lost only 2.0 after 1000 revolutions compared with a nylon loss of 5.4 mg. Addition of colloidal silica to the coating gives still further wear resistance. A coating formed from 35% CSZ–ID–2, 60% colloidal silica, and 5% colloidal Teflon showed a loss of only 0.5 mg. after 1000 revolutions.

C. A stable coating composition with 40% total solids was prepared containing 30 parts CSZ–ID–2, 17 parts CSZ–IB, 33 parts colloidal Teflon (Type 30), and 20 parts colloidal silica (Ludox AS) in 150 parts of 33% aqueous methanol. Applied to a wire and cured at 80° C. for 15 minutes, smooth coatings were obtained having a very low coefficient of friction between 0.11 and 0.12 as well as excellent adhesion and abrasion resistance.

EXAMPLE 4

CSZ-Latex Coating Compositions

Coatings prepared from CSZ-Silica sol systems as in Example 2 are very hard but on metal substrates have low impact resistance and flex. However, the CSZ monomers are compatible with a synthetic or natural latex which is stable in the presence of base. Addition of a latex having colloidal particles with an average diameter of about 20–300 mµ greatly increases the impact resistance and flex of coatings having a polymerized CSZ binder.

A. To a solution of 3 parts CSZ–ID–2 in 17 parts of water was added 1 part of a styrene-butadiene-2% acrylic acid latex (54% solids) prepared by the process of Miller et al. U.S. Pat. 3,563,946. The coating solution was applied to a polystyrene molding sheet and cured at 80° C. for 10 minutes. The Figure is a photomicrograph (37,840×) of a stained cross-section of the latex particles dispersed in the polymerized CSZ film. The very uniform dispersion of the latex and the retention of colloidal form without signficant agglomeration or coalescence is clearly shown.

B. Table 3 gives typical results from addition of the same styrene-butadiene-2% acrylic acid latex to a CSZ-colloidal silica coating composition followed by curing at 85° C. for 15 minutes to give a 0.5–0.7 mil coating on a steel test panel.

TABLE 3
CSZ-silica-latex compositions

| Number | Coating composition a | | | Kentron-Knoop hardness | Reverse impact, in.-pounds |
|---|---|---|---|---|---|
| | CSZ–ID–2, percent | SiO2, percent | Latex, percent | | |
| 3–1 | 57.6 | 42.4 | 0 | 50 | 5 |
| 3–2 | 54.0 | 40.0 | 6 | 42 | 10 |
| 3–3 | 50.5 | 37.2 | 12.3 | 37 | 30 |
| 3–4 | 46.4 | 34.2 | 19.4 | 24 | 40 |
| 3–5 | 40.3 | 29.7 | 30 | 20 | 80 |
| 3–6 | 36.9 | 27.1 | 36 | 11.5 | 160 | a Wt. percent on CSZ-SiO2 solids.

C. In another test a coating composition containing 24.6 parts CSZ–IB, 26.2 parts CSZ–ID–2, and 49.2 parts colloidal silica had a Kentron-Knoop hardness of 50 but reverse impact of <5 in.-lbs. Addition of about 16 parts of a dimethyl monomethyl silicone latex (25.3% solids) increased the reverse impact to 20 in.-lbs. With 40 parts of the silicone latex, the reverse impact was greater than 160 in.-lbs.

EXAMPLE 5

CSZ-Silicone Oil Compositions

The polymerized CSZ are effective binders not only for neutral or basic colloidal sols but also for colloidally dispersed liquids such as silicone oil emulsions.

A. A coating composition was prepared containing about 4 parts CSZ–ID–2, 6 parts CSZ–IB, 20 parts 30% aqueous methanol and 1.2 parts of a 100,000 cs. silicone fluid emulsion having a particle size <500 mµ (Dow Corning HV-490 Emulsion, Midland, Mich.). Applied to a glass plate and cured at 80° C. for 10 minutes, the CSZ-silicone oil sol gave an adherent coating with very high lubricity and water repellancy.

B. A similar coating was obtained using another silicone fluid emulsion, (Dow Corning 36 Emulsion). Photomicrographic examination revealed fine silicone oil droplets essentially uniformly dispersed throughout the polymerized CSZ.

We claim:

1. An aqueous coating composition comprising:
   A. A water-soluble, thermally polymerizable monomer consisting of at least one cyclic sulfonium zwitterion of the formula:

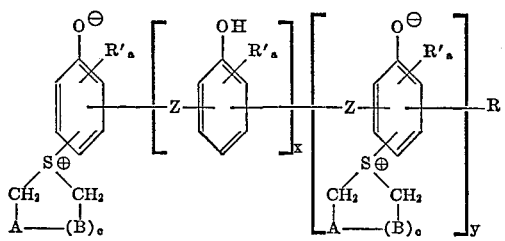

where R is H, Cl, Br, OH, or —OC$_1$–C$_4$ alkyl; R' is H, Cl, Br, or C$_1$–C$_4$ alkyl and $a$ is 0–2; Each sulfonium group is ortho or para to the phenoxide group; A and B are —CH$_2$— or —CHR', and $c$ is 1 or 2; Z is a bridging group of the formula:
   (1) —O—, —S—, or —O(C$_m$H$_{2m}$)O— where $m$ is 1–6, and $\Sigma(x+y)=0$–1;
   (2) —CR$_2''$— where R" is C$_1$–C$_4$ alkyl, and $\Sigma(x+y)=0$–1;
   (3) 

where $n$ is 0–6, and $\Sigma(x+y)=0$–1; or
   (4) —CH$_2$— where $\Sigma(x+y)=0$–20; and B. An aqeous inorganic or organic colloidal sol stable at alkaline pH and having colloidal particle size of about 1–1000 mµ; said composition forming on drying a water-insoluble polymer with the colloidal particles essentially uniformly dispersed throughout the polymer matrix.

2. The aqueous coating composition of claim 1 where the sulfonium monomer is a tetramethylenesulfonium phenoxide of Formula I with —A—(B)$_c$— being

—CH$_2$CH$_2$—.

3. The aqeuous coating composition of claim 2 where the sulfonium monomer has an average of at least 1.1 S$^\oplus$/mer.

4. The aqueous coating composition of claim 2 where the sulfonium monomer is selected from the group:

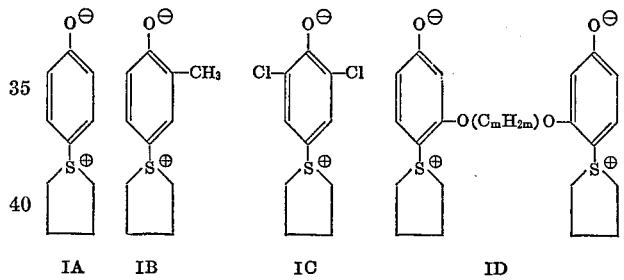

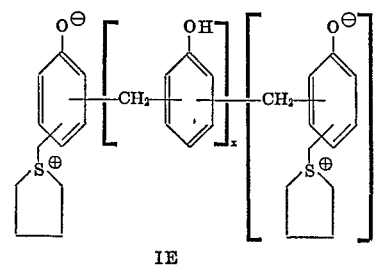

or a mixture thereof.

5. The aqueous coating composition of claim 4 containing as a cross-linking monomer the bisresorcinol ether sulfonium zwitterion of Formula ID.

6. The aqueous coating composition of claim 4 containing as a cross-linking monomer a water-soluble novolac sulfonium zwitterion of Formula IE having an average degree of polymerization of about 2–5 and at least 1.1 S$^\oplus$/mer.

7. The aqueous coating composition of claim 4 containing as the sulfonium monomer a mixture of about 40–75 wt. percent of the o-cresol monomer IB and 60–25 wt. percent of the bisresorcinol ether monomer ID.

8. The aqueous coating composition of claim 1 where the colloidal sol is an aqueous alkaline silica sol.

9. The aqueous coating composition of claim 1 where the colloidal sol is an aqueous alkaline dispersion of a tetrafluoroethylene resin.

10. The aqueous coating composition of claim 1 where the colloidal sol is an alkali stable styrene-butadiene latex.

11. The aqueous coating composition of claim 1 where the colloidal sol is an alkali-stable emulsion of a silicone fluid.

12. The aqueous coating composition of claim 2 containing at least 15 wt. percent of the cyclic sulfonium zwitterion monomer and at least 5 wt. percent colloid based on total composition.

13. The aqueous coating composition of claim 4 containing about 16±2% monomer ID, 24±3% monomer IB, and 60±5% colloidal silica based on total weight of sulfonium monomers and colloidal silica.

14. A water-insoluble polymer coating having colloidal particles essentially uniformly dispersed throughout the polymer matrix and prepared by drying and thermal polymerization of the aqueous cyclic sulfonium zwitterion-colloidal sol composition of claim 1.

15. The water-insoluble, hard and scratch-resistant polymer coating of claim 13 prepared from the aqueous cyclic sulfonium zwitterion-colloidal silica sol composition of claim 12.

16. The water-insoluble polymer coating of claim 13 prepared from the aqueous cyclic sulfonium zwitterion-colloidal tetrafluoroethylene polymer sol composition of claim 9.

17. An aqueous silica sol stabilized with a cyclic sulfonium phenoxide zwitterion of Formula I.

18. The aqueous silica sol of claim 17 stabilized with 4-(tetramethylenesulfonium)phenoxide (IA).

19. The aqueous silica sol of claim 17 stabilized with 2-methyl-4-(tetramethylenesulfonium)phenoxide (IB).

References Cited

UNITED STATES PATENTS

| | | | |
|---|---|---|---|
| 3,636,052 | 1/1972 | Hatch et al. | 260—47 R |
| 3,660,431 | 5/1972 | Hatch et al. | 260—47 R |
| 3,544,499 | 12/1970 | Hatch | 260—29.6 |
| 2,577,485 | 12/1951 | Rule | 260—29.6 |
| 2,597,872 | 5/1952 | Iler | 260—29.6 |
| 3,655,603 | 4/1972 | Morton et al. | 260—29.6 F |
| 3,256,234 | 6/1966 | Miller et al. | 260—29.7 |
| 3,553,394 | 1/1971 | Zidlicky | 252—12 |
| 2,983,504 | 5/1961 | Reuter et al. | 252—12 |
| 3,508,945 | 4/1970 | Haemer et al. | 252—12 |

OTHER REFERENCES

Payne: "Organic Coating," vol. II, 1961, pp. 712–715.

MURRAY TILLMAN, Primary Examiner

A. H. KOECKERT, Assistant Examiner

U.S. Cl. X.R.

161—187; 252—12; 260—29.1 SB, 29.2 R, 29.6 NR, 29.7 NR, 37 R, 38, 41 A, 41.5 A, 47 R, 59, 887, 29.6 F